United States Patent

Yanagihara et al.

[11] Patent Number: 5,742,728
[45] Date of Patent: Apr. 21, 1998

[54] APPARATUS AND METHOD FOR RECORDING AND/OR REPRODUCING PICTURE DATA OPERABLE TO OUTPUT ZEROS IF A PICTURE HEADER IS DETECTED DURING VARIABLE SPEED REPRODUCTION

[75] Inventors: Naofumi Yanagihara, Tokyo; Nobuaki Izumi, Chiba, both of Japan

[73] Assignee: Sony Corporation, Tokyo, Japan

[21] Appl. No.: 552,871

[22] Filed: Nov. 3, 1995

[30] Foreign Application Priority Data

Nov. 7, 1994 [JP] Japan .................................. 6-272193

[51] Int. Cl.$^6$ .................................................. H04N 5/783
[52] U.S. Cl. .................................. 386/68; 386/95; 386/111
[58] Field of Search .................................. 386/68, 69, 109, 386/111, 112, 95, 98, 100, 101, 96, 104, 33, 6–8; 360/8, 48; 370/60, 60.1, 94.1, 94.2, 100.1, 84; 348/423; H04N 5/76, 9/79, 5/92, 7/12, 11/02, 11/04

[56] References Cited

U.S. PATENT DOCUMENTS

| | | | |
|---|---|---|---|
| 5,068,752 | 11/1991 | Tanaka et al. | 386/104 |
| 5,384,787 | 1/1995 | Yoshinaka | 386/113 |
| 5,477,397 | 12/1995 | Naimpally et al. | 386/111 |
| 5,543,931 | 8/1996 | Lee et al. | 386/68 |
| 5,557,419 | 9/1996 | Muto | 386/111 |
| 5,566,174 | 10/1996 | Sato et al. | 386/96 |
| 5,596,581 | 1/1997 | Saeijs et al. | 386/104 |

FOREIGN PATENT DOCUMENTS

| | | | |
|---|---|---|---|
| 536630 | 4/1993 | European Pat. Off. | H04N 9/79 |
| 562845 | 9/1993 | European Pat. Off. | H04N 5/92 |
| 0 627 853 A | 12/1994 | European Pat. Off. | |
| WO 94 17631 A | 8/1994 | WIPO | |

*Primary Examiner*—Than Tran
*Attorney, Agent, or Firm*—Frommer Lawrence & Haug LLP; William S. Frommer

[57] ABSTRACT

A recording/reproducing apparatus for reproducing recorded encoded picture data from a recording medium in varying speed without picture disruption. The recorded picture data are read from the recording medium and stored in a buffer memory. A detection circuit detects a picture header in the stored picture data and, depending upon the results of such detection, may or may not supply a clock signal therefrom. If a picture header is not detected, the detection circuit supplies the clock signal to the buffer memory and a delaying circuit. In response thereto, the stored picture data are read out from the buffer memory and supplied to the delaying circuit so as to be delayed by a predetermined amount prior to being supplied therefrom. If a picture header is detected during varying speed reproduction by the detection circuit, the clock signal is not supplied to the buffer memory and the delaying circuit, whereupon the delaying circuit outputs "0"s for a predetermined time period.

11 Claims, 10 Drawing Sheets

DISPLAY SEQUENCE

| 1 | 2 | 3 | 4 | 5 | 6 | 7 | 8 | 9 | 10 | 11 | 12 | 13 |
|---|---|---|---|---|---|---|---|---|----|----|----|----|
| I | B | B | P | B | B | P | B | B | I  | B  | B  | P  |

ON BITSTREAM

| 1 | 4 | 2 | 3 | 7 | 5 | 6 | 10 | 8 | 9 | 13 | 11 | 12 |
|---|---|---|---|---|---|---|----|---|---|----|----|----|
| I | P | B | B | P | B | B | I  | B | B | P  | B  | B  |

APPARATUS AND METHOD FOR RECORDING AND/OR REPRODUCING PICTURE DATA OPERABLE TO OUTPUT ZEROS IF A PICTURE HEADER IS DETECTED DURING VARIABLE SPEED REPRODUCTION

BACKGROUND OF THE INVENTION

The present invention relates to a picture data recording and/or reproducing apparatus for recording and/or reproducing data of a bitstream compressed in accordance with a MPEG standard and, more particularly, to such apparatus operable for providing slow speed reproduction of the recorded bitstream data from a tape recording medium.

In a digital video tape recorder (hereinafter, a digital VTR), high definition picture data, which is compressed or encoded in accordance with a predictive coding technique, may be recorded/reproduced on or from a magnetic tape by utilizing a rotary head. Such predictive encoding technique may comply with a so-called MPEG (Motion Picture Experts Group) standard.

In a MPEG standard or system, data or information is encoded in encoding units or so-called macro-blocks. For each such macro-block, the information may be compressed by temporal compression in accordance with temporal inter-picture correlation and spatial compression utilizing a discrete cosine transform (DCT) and subsequently encoded by variable length encoding or Huffman code.

Further, in the MPEG system, the information or data may be arranged in pictures which correspond to video frames. As hereinafter more fully described, each of these pictures may be either an intra-coded (I) picture, an inter-frame predictively coded (P) picture or a bi-directionally predictive coded (B) picture and such pictures may be arranged in a predetermined sequence. A plurality of such pictures may be further arranged into a so-called group-of-pictures (GOP). Each such GOP includes at least one intra-frame coded (I) picture. Such GOP arrangement or structure may be utilized to enable or facilitate random accessing of a desired picture within a respective GOP.

Furthermore, during encoding in the MPEG system, a memory, which may be a random-access memory (RAM) or a read-only memory (ROM), may be utilized. Such use of the memory may facilitate in the forming of a picture, such as a predicted picture. Such predicted or "future" picture (this picture may lie ahead of a current picture by one or more pictures) is formed based upon an intra-frame coded picture, and the space in-between is filled with bi-directionally coded pictures. Such bi-directional prediction enables a relatively high compression ratio to be achieved, although additional encoding time may be required. On the other hand, during decoding, real-time processing is utilized.

The MPEG encoding system is not limited to only a predetermined picture size or resolution, but may be applied to a number of systems. For example, the MPEG encoding system may be applied to the NTSC and PAL systems.

Picture data, which is encoded in accordance with the MPEG system, may be recorded onto tracks of the recording medium by utilizing a so-called inclined azimuth recording system. In such recording system, data may be recorded/reproduced into/from two neighboring tracks by two heads having gap directions which are inclined relative to each other. Encoded picture data corresponding to one frame may be recorded across a plurality of tracks on the recording medium or magnetic tape.

In reproducing data from a track with the above digital VTR, an output or reproduced data is obtained only from the head having an inclination angle of the gap direction (or azimuth) which is coincident with that utilized in recording the data. In other words, data is not reproduced from the head having the non-coincident azimuth angle. As such, the tape feed stop position is controlled so as to cause the two heads to respectively trace the tracks having the coincident azimuth angle such that the two heads alternatively reproduce playback signals therefrom.

In the above digital VTR, the heads sequentially scan the track patterns during a normal-speed reproduction mode. However, during a varying-speed reproduction mode, the heads obliquely scan the track patterns on the magnetic tape. The varying-speed reproduction may be obtained by changing the running speed of the magnetic tape. For example, a time to tape displacement ratio may be 1:3 and 3:1 for triple speed reproduction and ⅓ slow speed reproduction, respectively, as compared to 1:1 for normal speed reproduction.

If a slow speed reproduction is performed with the above digital VTR, data may be read out discontinuously. For example, consider the situation in which picture data which is compression encoded in accordance with the above-described MPEG system is to be reproduced with a slow speed. In such situation, since the amount of data available to be read out per unit time may be decreased, it may be necessary to increase the amount of read or sent-out data so as to match the bit rate or period to the original bit rate or period. To increase the amount of such data, "0"s may be simply inserted or stuffed therein. As a result, "0"s may be added between portions of data, thereby producing a discontinuous or interrupted boundary or boundaries of read-out data as, for example, illustrated in FIG. 15. As shown therein, "0"s are inserted or stuffed between portions of I and P picture data which are read-out from the tape in each scan or trace of the heads so as to effectively match the bit rate to the original bit rate. (As hereinafter more fully described, a picture header (PH) precedes the data of each picture.) During the decoding of such data by a MPEG decoder, the stuffed "0"s may be mistakenly processed as "normal" image data. Accordingly, the MPEG decoder may incorrectly decode the original data such that the picture is disrupted during slow-speed reproduction.

As is to be appreciated, it would be desirable to correctly decode picture data which is encoded by a predictive coding technique, such as that which complies with a MPEG standard, during slow speed reproduction.

OBJECTS AND SUMMARY OF THE INVENTION

An object of the present invention to provide a picture data reproducing apparatus and picture data recording/reproducing apparatus wherein picture data encoded by a predictive encoding system may be decoded and displayed without disruption during slow-speed reproduction of the same.

Another object of the present invention is to provide a picture data reproducing apparatus and picture data recording/reproducing apparatus as aforesaid in which the encoded picture data includes picture header information and in which "0"s are added only prior to a picture header during slow-speed reproduction.

A further object of the present invention is to provide a picture data reproducing apparatus and picture data recording/reproducing apparatus as aforesaid in which the picture data is encoded by a predictive encoding system wherein picture signals are compression encoded by bi-directional motion-compensated inter-frame predictive coding and discrete cosine transform and subsequently encoded by variable length encoding.

A still further object of the present invention is to provide a picture data reproducing apparatus and picture data recording/reproducing apparatus as aforesaid in which the encoded picture data represent a plurality of intra-coded (i), inter-frame predictively coded (P) and bi-directionally predictive coded (B) pictures and in which "0"s are added only prior to a picture header of an I picture or a B picture during slow-speed reproduction.

In accordance with an aspect of the present invention, an apparatus for reproducing picture data is provided. The apparatus comprises a readout device for reading out picture data encoded from picture signals by a predictive encoding system and recorded on a recording medium; a storage device for storing the picture data read out by the readout means; a detection device for detecting a picture header from the picture data stored in the storage device; and a delaying device for delaying an output of the picture data stored in the storage device in response to detection results obtained by the detection device. The delaying device outputs "0"s for a predetermined time period if the picture header is detected by the detection device during varying speed reproduction.

In accordance with another aspect of the present invention, an apparatus for recording/reproducing picture data is provided. The apparatus comprises a recording device for recording picture data encoded from picture signals by a predictive encoding system on a recording medium. The apparatus further comprises a reproducing device having a readout device for reading out the picture data recorded on the recording medium, a storage device for storing the picture data read out by the readout device, a detection device for detecting a picture header from the picture data stored in the storage device, and a delaying device for delaying an output of the picture data stored in the storage device in response to detection results obtained by the detection device. The delaying device outputs "0"s for a predetermined time period if the picture header is detected by the detection device during varying speed reproduction.

In the present reproducing and recording/reproducing apparatus, the picture data are encoded in accordance with a predictive encoding system in which the picture data are compression-coded by bi-directional motion-compensated inter-frame predictive coding followed by discrete cosine transform and variable length encoding. Additionally, in such present apparatus, the delaying device may output "0"s for a predetermined time period which may have a value of (k−1)/fr, wherein 1/k represents a speed multiple reduction factor during varying speed reproduction and fr represents the picture or frame rate.

Other objects, features and advantages of the present invention will become apparent from the following detailed description of the illustrated embodiments when read in conjunction with the accompanying drawings in which corresponding components are identified by the same reference numerals.

DESCRIPTION OF THE PREFERRED EMBODIMENTS

Preferred embodiments of the present invention will now be described with reference to the accompanying drawings.

Figure 1:
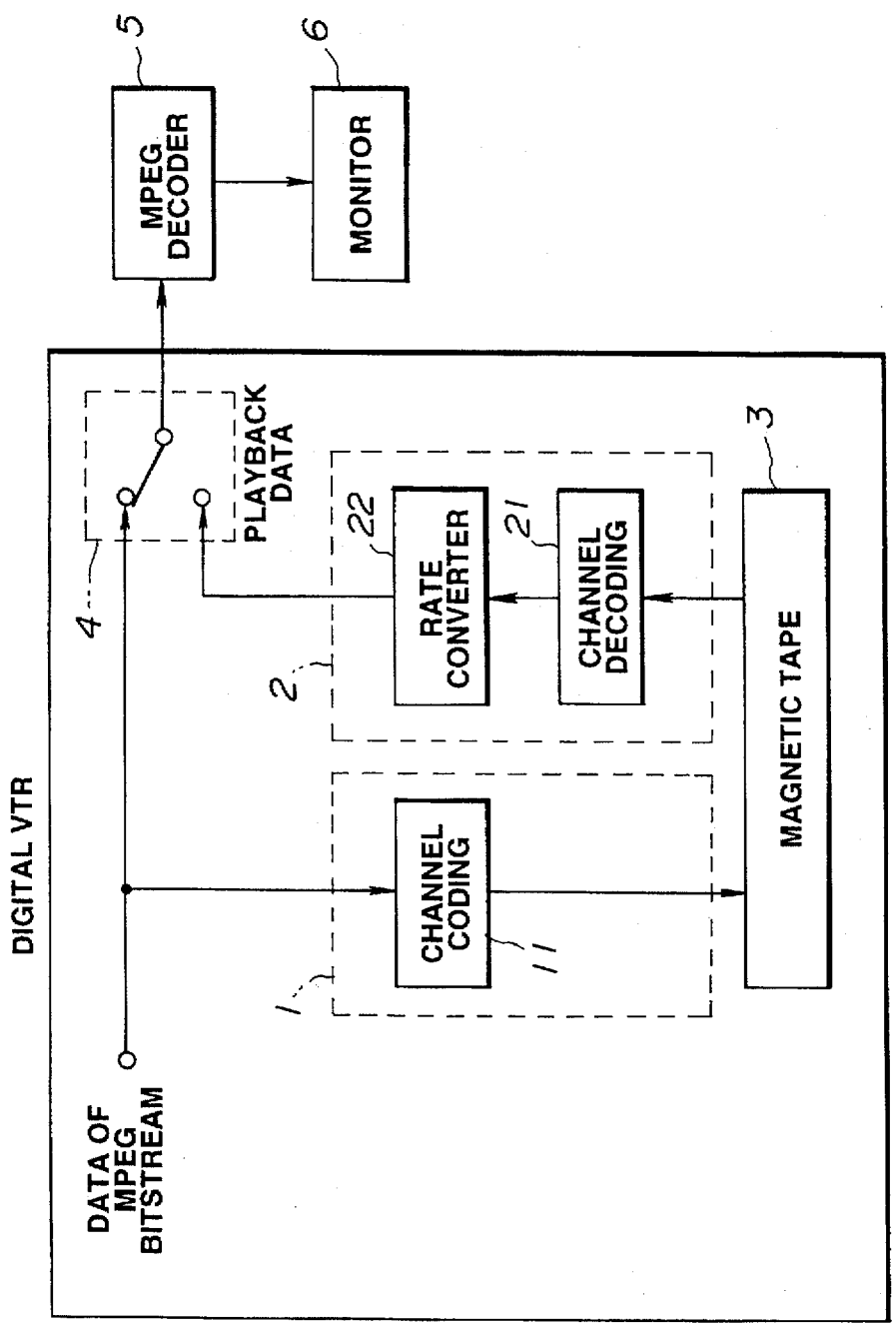
FIG. 1 is a diagram of a digital video tape recorder having a picture data recording/reproducing apparatus according to an embodiment of the present invention.

FIG. 1 illustrates a digital video tape recorder (digital VTR) having a picture data recording/reproducing apparatus. As shown therein, such digital VTR includes a recording unit 1, a reproducing unit 2 and a switch 4.

The recording unit 1 includes a channel coding unit 11 and a recording rotary magnetic head (not shown). The recording unit 1 receives picture data which may be obtained by compression encoding picture signals in accordance with a predictive coding system or standard. For example, such picture data may be an MPEG data bitstream. The recording unit 1 encodes the received picture data in the channel coding unit 11 and supplies the coded picture data to the recording head so as to be recorded onto a recording medium, such as a magnetic tape 3.

The reproducing unit 2 includes a channel decoder 21, a rate converter 22 and a reproducing rotary head (not shown). The reproducing head reproduces picture data from the magnetic tape 3. Such reproduced picture data is supplied to the channel decoder 21, whereupon the data is channel decoded in a manner substantially opposite to that performed by the channel coding unit 11. The channel decoded picture data is supplied to the rate converter 22 which is adapted to convert the rate at which data is read as hereinafter more fully described.

The switch 4 receives the MPEG data bitstream and an output signal from the rate converter 22. The switch 4 is operable in response to a control signal supplied from a control unit (not shown) so as to select either the MPEG data signal or the rate converter output signal. The selected signal is supplied to a MPEG decoder 5, whereupon the received signal is decoded in a manner as more fully hereinafter described. The decoded signal from the MPEG decoder 5 is displayed on a monitor 6.

As previously described, the picture data recorded on the magnetic tape 3 by the recording unit 1 may have been compression encoded by a predictive encoding system in accordance with a MPEG standard. Such MPEG encoding will now be described.

Figures 2, 3:
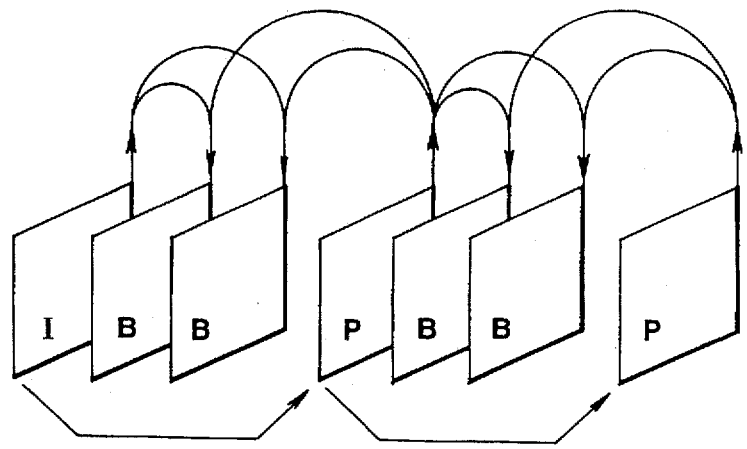
FIG. 2 is a diagram to which reference will be made in explaining the formation of encoded pictures.
FIG. 3 illustrates a display sequence and a bitstream sequence of the pictures of FIG. 2.

In the MPEG system, video or picture data is processed or compressed on a predetermined basis such as a frame basis which may be expressed in units of pictures corresponding thereto. In such system, there are three types of processing or pictures, that is, an intra-coded (I) picture, an inter-frame predictively coded (P) picture and a bi-directionally predictive coded (B) picture. An I picture is generated by using only data within that respective frame or picture. A P picture may be generated by using data from a temporally preceding and previously decoded I or P picture or frame. A B picture may be generated by using data from a temporally preceding or succeeding and already decoded I or P picture or frame, or a combination thereof. Such generation of these pictures is illustrated in FIG. 2. For example, as shown in FIG. 2, the fourth picture from the left (which is a P picture) is formed from the first picture from the left (which is an I picture).

The pictures may have a predetermined display sequence such as that illustrated in FIG. 3. As shown therein, such sequence may be I, B, B, P, B, B, P, B, B, I, B, B, P and so forth. Although the pictures are displayed in this sequence, the pictures may not be supplied or processed in the same sequence. That is, depending upon the type of picture (or processing to be performed), the processing or bitstream sequence may vary from the display sequence as shown in FIG. 3. More specifically, since the B picture is a bi-directionally encoded picture which may be formed from previously decoded I and/or P pictures as previously described, the B pictures are interchanged in the bitstream sequence with the respective P picture or I picture which is later in the display sequence. For example, the second and third pictures in the display sequence (which are B pictures) may be interchanged with the fourth picture therein (which is a P picture) as shown in FIG. 3. As a result, these B pictures, which are displayed between I and P pictures, are encoded after encoding the respective I picture and P picture.

Further, as previously described, a plurality of pictures may be arranged within a group-of pictures (GOP) in which each such GOP may include an I picture. As is to be appreciated, such I-pictures may provide independence for each GOP so as to facilitate random accessing of a desired picture within a respective GOP. However, there may be occasions wherein intra-coding is performed in small block-based portions of a P-picture or B-picture.

Figure 4:
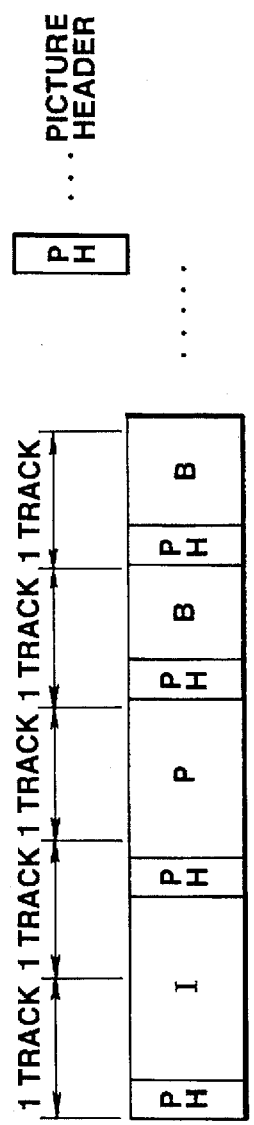
FIG. 4 is a diagram of a data format.

Each picture may include a picture header PH which is arranged so as to precede the respective picture data as, for example, shown in FIG. 4. Such picture header PH includes a picture start code having a predetermined number and type of bits. For example, the picture header may have 32 bits of data having a hexadecimal value of "00000100". (As is to be appreciated, each hexadecimal digit in this value represents four bits of binary data.)

The MPEG system provides that 23 or more bits of "0"s should not appear in succession except at the start code. Accordingly, in MPEG, if a "1" appears subsequent to 23 or more bits of "0"s during a reading operation, such data may be judged to be a start code. Thus, in other words, for a start code to be detected in an MPEG system, 23 or more bits of "0"s are provided prior to a "1".

The first six most significant digits of the above hexadecimal value 00000100 (that is, "000001") are equivalent to 23 binary bits of "0"s and a "1" bit. Accordingly, such hexadecimal value will be detected as a start code in an MPEG system. As is to be appreciated, the two least significant digits (that is, the two right most digits) of the hexadecimal value do not have to be "00" for such hexadecimal value to be detected as a start code. Accordingly, a plurality of hexadecimal values other than 00000100 may be used. Such hexadecimal values may be represented by "000001" wherein each of the two least significant digits () may be any hexadecimal digit.

Thus, the recording unit 1 records the input bitstream data or MPEG data shown in FIG. 4 on the magnetic tape 3 with a bit rate R.

In the MPEG system, "0"s may be inserted or stuffed ahead of the start code. Accordingly, in the present digital VTR, an amount of "0"s corresponding to the desired lowering of the data rate are stuffed directly ahead of the start code. Such stuffing of "0"s is performed in the rate converter 22 of the reproducing unit 2 (FIG. 1) as described below.

Figure 5:
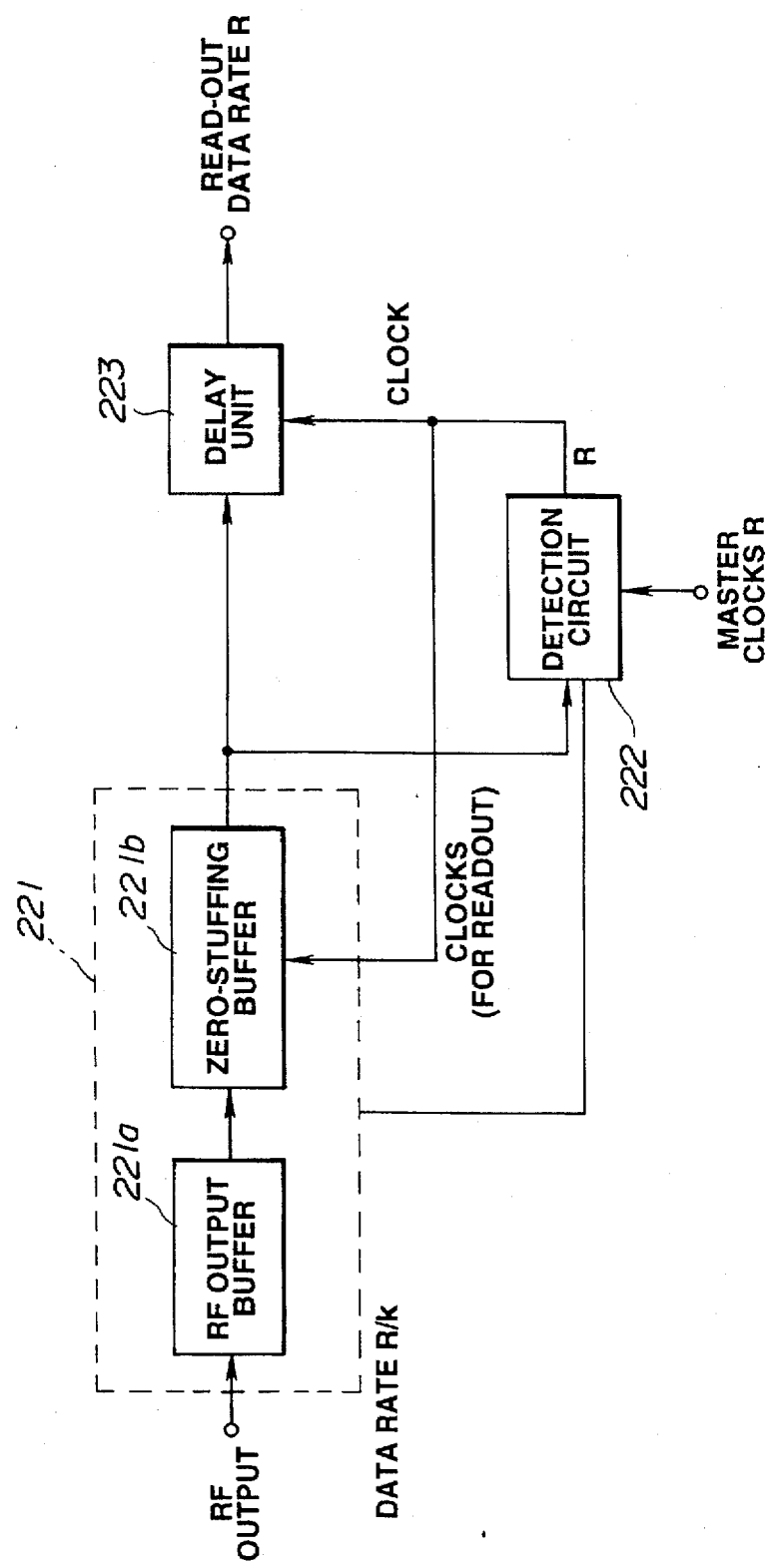
FIG. 5 is a diagram of a rate converter of the digital video tape recorder of FIG. 1.

As shown in FIG. 5, the rate converter 22 includes a memory 221, a detection circuit 222 and a delay circuit 223. The memory 221, which includes an RF output buffer 221a and a zero-stuffing buffer 221b, is adapted to receive and store reproduced MPEG data from the channel decoder 21 (FIG. 1) and to supply output data in accordance with a control signal from the detection circuit 222. The detection circuit 222 is adapted to receive the output data from the zero-stuffing buffer 221b of the memory 221 and to detect a picture header therein. Based upon the results of such detection, the detection circuit 222 may or may not supply a control or clock signal to the zero-stuffing buffer 221b and the delay circuit 223. The delay circuit 223 delays the MPEG data received from zero-stuffing buffer 221b in accordance with the clock signal received from the detection circuit 222. In response to the absence of the clock signal, the delay circuit 223 maintains the data currently held therein and causes a predetermined number of "0"s to be supplied therefrom.

The rate converter 22 of FIG. 5 will now be more fully described.

Figure 6:
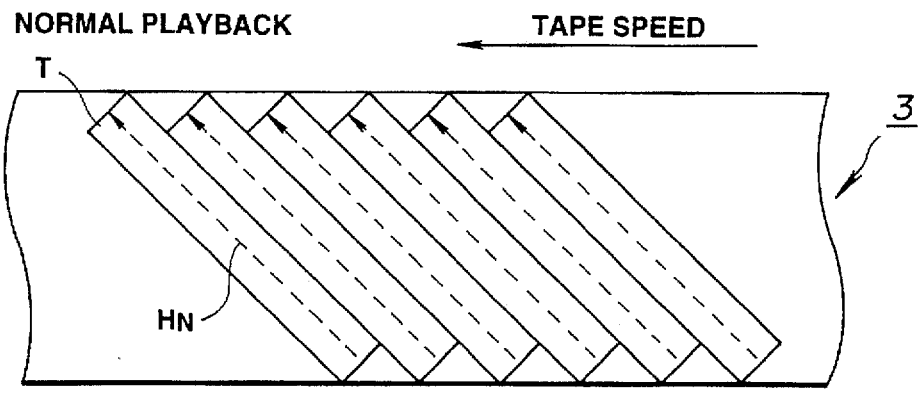
FIG. 6 is a diagram illustrating recording tracks and head trajectories during normal speed reproduction.
Figure 7:
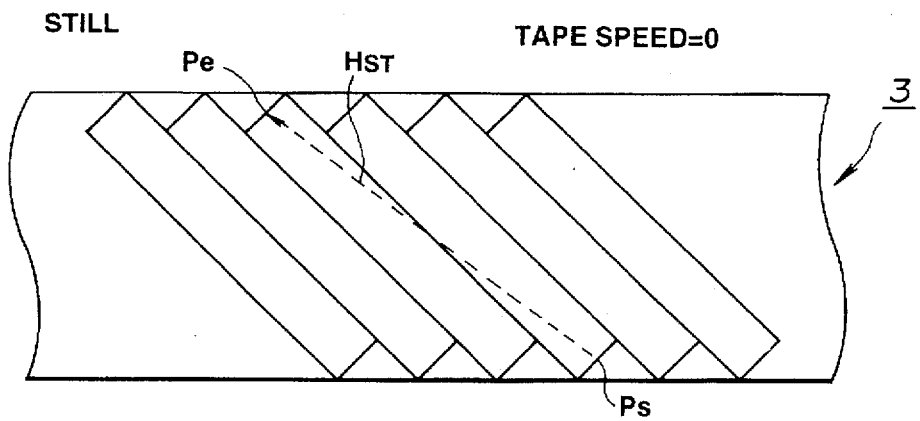
FIG. 7 is a diagram illustrating recording tracks and head trajectories during standstill.
Figure 8:
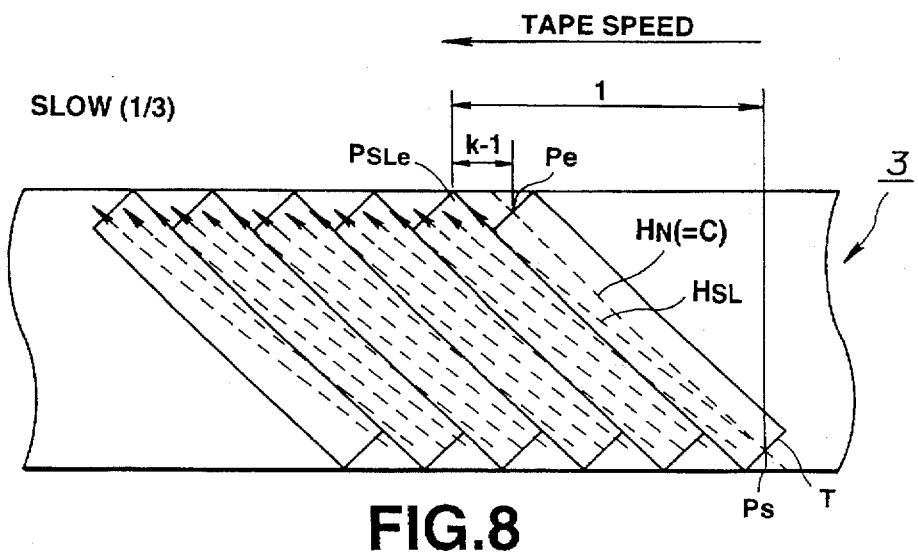
FIG. 8 is a diagram illustrating recording tracks and head trajectories during varying speed reproduction.
Figure 9:
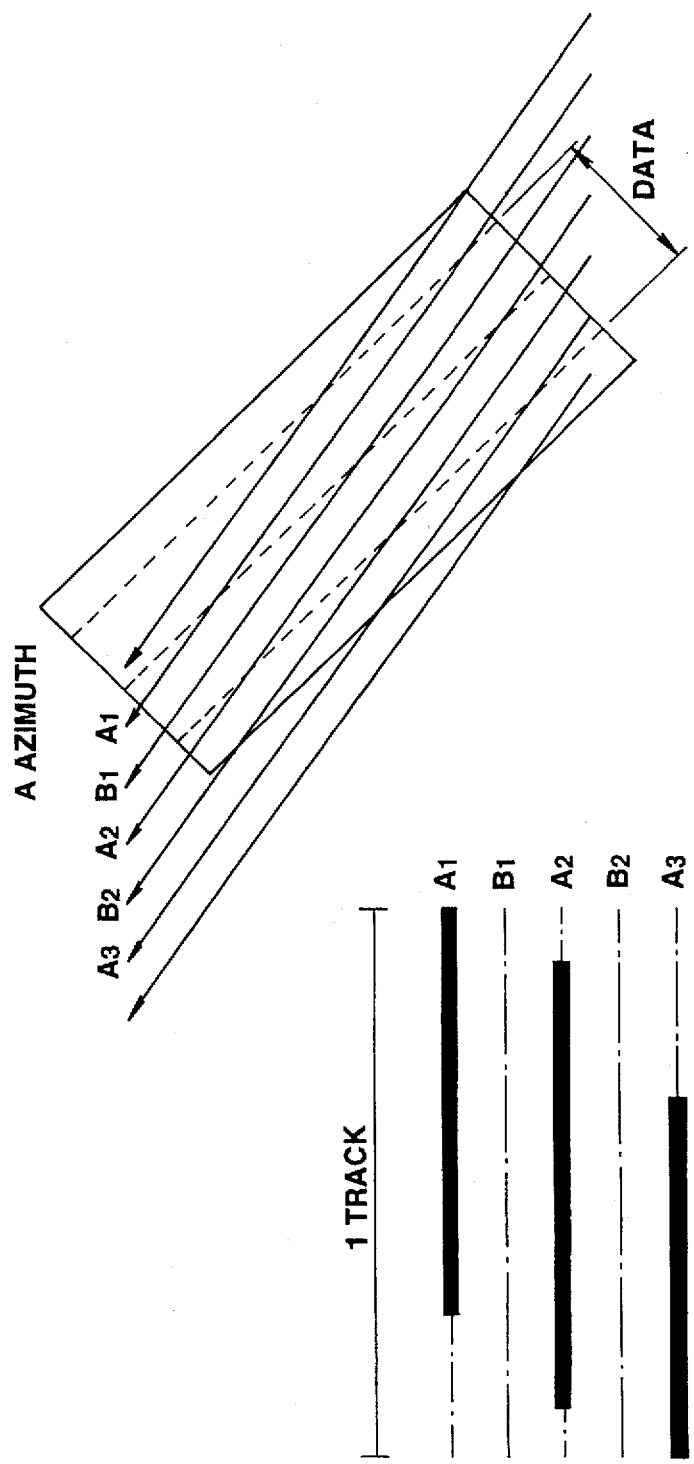
FIGS. 9A and 9B are diagrams to which reference will be made in explaining the data picked up from a magnetic tape during slow speed reproduction.

The RF buffer 221a, which may be a one track buffer, receives the reproduced digital MPEG data or RF signal from the channel decoder 21. Such RF output obtained during slow speed reproduction may include errors caused by signal dropout or superposition of one track data. The RF buffer 221a is adapted to compensate, correct or reduce such signal data dropout or superposition during slow-speed reproduction. More specifically, during normal speed reproduction (that is, reproduction or playback at a speed which is equal to the recording speed of the recording unit 1) of the data recorded on the magnetic tape 3 by the digital VTR, the angle of the track(s) and the angle at which the head(s) trace the track are coincident with each other, as shown in FIG. 6. In other words, in this situation, the track T is coincident with the head trajectory HN. As a result, the data of one track T may be picked up during a single tracing of such track. During each tracing of the head (HN) in normal speed reproduction, the magnetic tape 3 is advanced by one track. On the other hand, the magnetic tape 3 is not advanced during a standstill mode. In this latter situation, the head tracing angle is changed such that a one-track offset may be produced from a start point Ps and a terminal point Pe between the track and the head trajectory HST, as shown in FIG. 7. During slow-speed reproduction, such as during 1/k speed reproduction (wherein k is a number such as 3), a tracing start point (Ps) may be coincident with the tracing start point Ps for normal speed reproduction and a terminal point PSLe of the slow speed reproduction may be related to the terminal point Pe and the tracking start point Ps of the normal speed reproduction by a ratio (k−1):1 as shown in FIG. 8. Thus, during slow speed reproduction, the head trajectory HSL is offset from the track centerline C. As a result, if the playback speed is relatively slow such that the tracing angle is close to that during standstill, or if the C/N ratio (carrier-to-noise ratio) is poor such that data readout errors are frequently produced due to offsetting of the head tracing position from the track centerline C, then a single track of data may not necessarily be picked up by a single head tracing. In such situation, multiple tracings may be utilized to obtain the data of a single track. For example, the data picked up by a first tracing A1 may be combined with data picked up by a second tracing A2, a third tracing A3 and so forth so as to obtain all of the data within the desired track as shown in FIGS. 9A and 9B. (In FIG. 9A, the darkened areas represent valid data or data picked up during the respective tracing. Furthermore, in FIGS. 9A and 9B, A1–A3 represent tracings performed by one head and B1–B3 represent tracings performed by another head.) In such tracings, the head(s) have been moved.

The MPEG data recorded on the magnetic tape 3 may be read out therefrom at a mean bit rate of R/k, wherein R is the bit rate during recording and 1/k represents the playback speed or playback speed multiple or reduction factor. As a result, data may be written into the RF output buffer 221a at a bit rate of R/k. Upon the occurrence of a predetermined event, data may be read out from the RF output buffer 221a and supplied to the zero-stuffing buffer 221b. As an example, if one track of data is written in the RF output buffer 221a, which as previously described may be a one track buffer, the stored data may be read and supplied to the zero-stuffing buffer 221b. In such situation, data is read out once for every k times of head tracing. Such writing/readout of the RF output buffer 221a is controlled by a controller (not shown).

Figure 10:
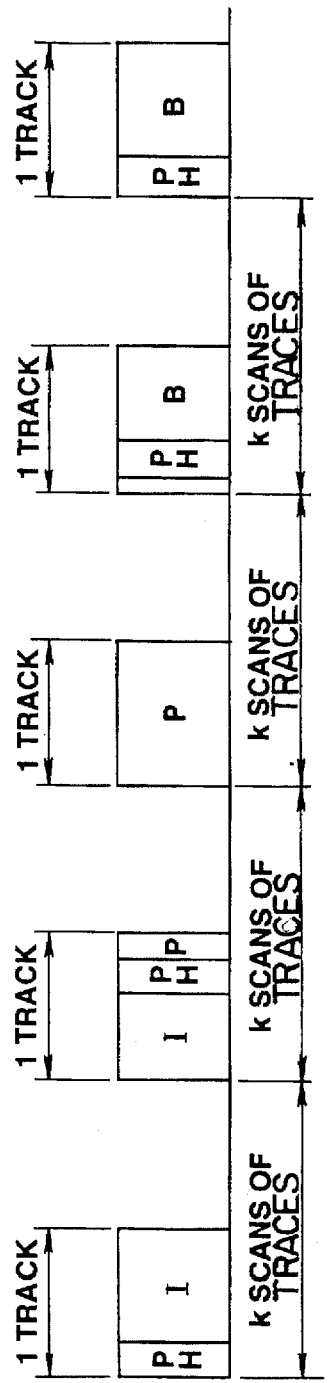
FIG. 10 is a diagram illustrating data supplied from an RF buffer of the rate converter of FIG. 5.

The data read out from the RF output buffer 221a and supplied to the zero-stuffing buffer 221b is partitioned track-by-track as shown in FIG. 10. As is to be appreciated, this partitioned arrangement differs from the recording MPEG data format of FIG. 4. The bit rate during this reading may be the same as that for recording, that is, a bit rate R.

A write permit flag or write enable signal may be generated by the controller for the RF output buffer 221a. This write permit flag may be appended to a track of read-out data. Such write permit flag is set or "turned on" only during readout which occurs once every k times of head tracing.

Referring back to FIG. 5, the zero-stuffing buffer 221b may be a first-in first-out buffer (FIFO) having a storage capacity which is preferably capable of storing a quantity of bits at least as large as that of the largest frame in the picture sequence. Data from the RF output buffer 221a, whose write permit flag is ON, is written in the zero-stuffing buffer 221b at the same bit rate R as that for recording. The data written in the zero-stuffing buffer 221b is the same as that recorded on the magnetic tape 3. Data from the zero-stuffing buffer 221b is readout therefrom and supplied to the detection circuit 222 and the delay unit 223 which, in turn, supplies an output signal to the switch 4 (FIG. 1). Such data supply or readout from the zero-stuffing buffer 221b and the delay unit 223 is controlled by the detection circuit 222. That is, the detection circuit 222 is adapted to receive a master clock signal and to supply such master clock or control signal at a bit rate R (which is the same bit rate as that during recording) to the delay circuit 223 and the zero-stuffing buffer 221b so as to control the output of data therefrom.

More specifically, if data having a predetermined number of bits, such as that of the maximum size frame, is written in the zero-stuffing buffer 221b, the detection circuit 222 supplies read-out clock pulses (R) to the zero-stuffing buffer 221b so that data will start to be read out therefrom. The detection circuit 222 may initiate such supply of the readout clock pulses (R) in response to a signal from the memory 221. Such signal may indicate that the predetermined number of bits have been written into the zero-stuffing buffer or, alternatively, may indicate the start of the writing of data into the zero-stuffing buffer from the RF output buffer 221a, whereupon the detection circuit 222 waits a predetermined time before initiating the supply of the clock pulses, as hereinafter more fully described. The zero-stuffing buffer 221b outputs data to the delaying circuit 223 and to the detection circuit 222 based upon the clock pulses (R) from the detection circuit 222.

The delay circuit 223 may include a shift register, such as a 4-byte shift register. The delay circuit 223 is adapted to perform a shifting operation on the data received from the zero-stuffing buffer 221b based upon the clock pulses (R) from the detection means 222 and to output such data after a delay corresponding to a shift of 4 bytes. Such shifting operation continues as long as the clock pulses are supplied to the delay circuit 223. However, if the clock pulses (R) cease to be supplied to the delay circuit 223, then the shifting operation ceases, whereupon the data currently stored in the register is maintained and "00"s are supplied from the delay circuit for a predetermined time period so as to obtain a desired number of "00".

The detection circuit 222 checks the data received from the zero-stuffing buffer 221b for a picture start code "00000100" (4-byte rows). The detection circuit 222 supplies clock pulses (R) to the zero-stuffing buffer 221b and the delay circuit 223 as long as a picture code is not detected. However, upon detecting a picture start code, the detection circuit 222 ceases to transmit clock pulses (R) to the zero-stuffing buffer 221b and the delay circuit 223. As a result, data is stopped from being readout from the zero-stuffing buffer 221b and supplied to the delay means 223 and the detection means 222, and the shifting operation of the delaying means 223 is also stopped. Consequently, the data held by the register of the delay means 223 directly after detection of a picture start code by the detection means 222 is the 4-byte picture start code "00000100" Thereafter, a predetermined amount of "00"s are supplied from the delay unit 223.

Data may be stopped from being readout from the zero-stuffing buffer 221b and supplied to the delay circuit 223, as previously described, for an amount of time equal to the following:

$$(k-1)/fr$$

in which fr is the picture or frame rate and 1/k represents a multiple or speed reduction factor for varying speed reproduction. The number of pictures per unit time is fr/k and the number of "00"s inserted per unit time is as follows:

$$((k-1)R/k)$$

so that the bit rate is as follows:

$$((k-1)/k)R+(1/k)R=R$$

which is equal to the recording bit rate R.

Figure 11:
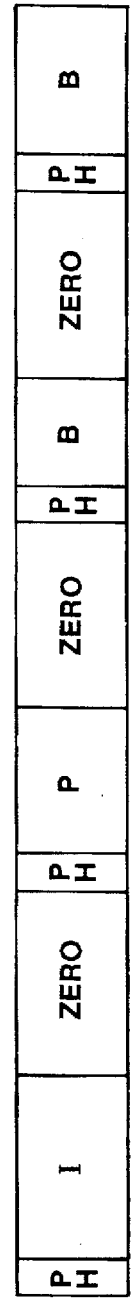
FIG. 11 is a diagram illustrating data supplied from a zero-stuffing buffer and a delay circuit of the rate converter of FIG. 5.

Therefore, upon detecting a picture start code, the clock pulses (R) are not transmitted from the detection circuit 222 for a time period (k−1)/fr, whereupon "00000100" is held in the register of the delay circuit 223. During this time period, the leading end data "00" held in the register of the delay circuit 223 is continuously read at the bit rate R. As a result, "00"s are outputted from the delay circuit 223 for a time of (k−1)/fr. Readout control of the delay circuit 223 may be performed by a controller which may be included within the delay circuit. Thus, the data outputted from the delay circuit 223 may be a bitstream in which a predetermined number of "00"s have been inserted ahead of a picture header PH as, for example, shown in FIG. 11. As shown therein, "00"s having a number of bits equal to (k−1)R/fr and a transmission interval or associated time period of (k−1)/fr (which may be expressed in seconds) are inserted prior to the picture headers PH.

Figure 12:
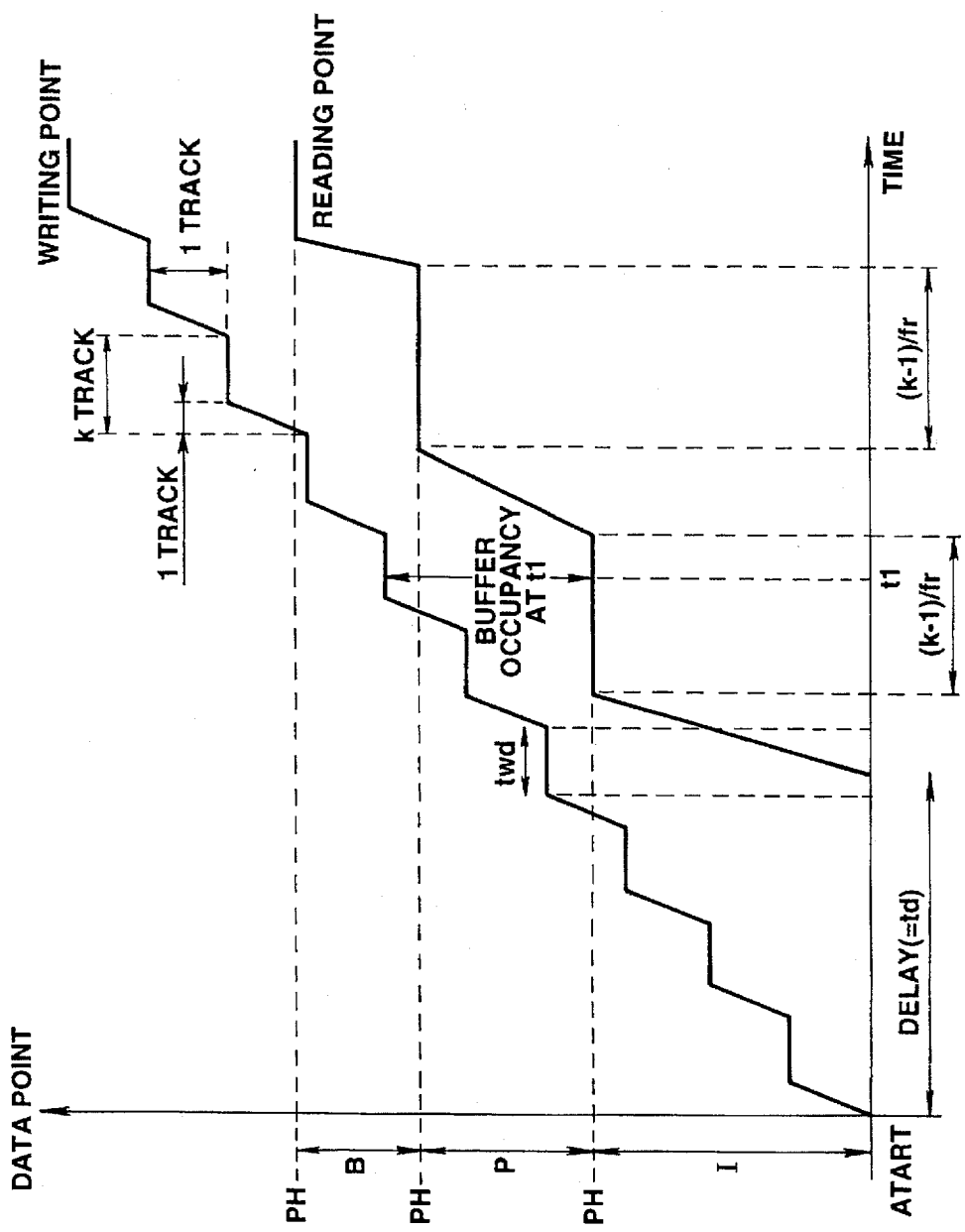
FIG. 12 is a diagram to which reference will be made in explaining the write/read timing of the zero-stuffing buffer of the rate converter of FIG. 5.

Write/readout timing of the data for the zero-stuffing buffer 221b is illustrated in FIG. 12. As shown therein, data readout from the zero-stuffing buffer 221b for supply to the delay circuit 223 (hereinafter referred to as readout) is started after a delay or lapse of time td since the start of writing data to the zero-stuffing buffer 221b from the RF output buffer 221a (hereinafter referred to as writing). The time td corresponds to the time wherein data in excess of that of an I picture is stored in the zero-stuffing buffer 221b buffer. In other words, data in excess of one frame may be in the zero-stuffing buffer 221b when readout is started. During readout, data is read out at the bit rate R until the respective picture header is detected by the detection circuit 222. Typically, one frame of data is larger than one track of data. Alternatively, a non-writing time twd may be inserted in the writing while one frame of data is read out. During this time (twd), the amount of data in the zero-stuffing buffer 221b is decreased. When a picture header is detected by the detecting circuit 222, readout is terminated during a time period (k−1)/fr. During this time period, the delay circuit 223 outputs "00"s at the rate R. Writing continues during this time period and, as a result, the amount of data in the zero-stuffing buffer 221b is increased. The writing and reading continues in a similar manner as shown in FIG. 12.

Since writing is performed once every k times of head tracing, the time for writing 1 second of original data is k seconds. With regard to readout, since there are fr frames per second of original data and readout stop time of (k−1)/fr second for each of these frames, readout takes k seconds. Thus, the average write and read rates or times therefor may be the same.

Since the zero-stuffing buffer 221b has a sufficiently large buffer capacity as previously described, even if the amount of data for storage therein is slightly increased, such data may be properly stored and read out. As is to be appreciated, if the amount of data for storage in the zero-stuffing buffer is less than that originally anticipated, such data may also be properly stored and readout.

With reference back to FIG. 1, one input terminal of the switch 4 receives the MPEG data bitstream (such as that shown in FIG. 4). The other input terminal of the switch 4 receives bitstream data (such as that illustrated in FIG. 11) from the delay circuit 223 of the rate converter 22, that is, MPEG data recorded by the recording unit 1 on the magnetic tape 3 and reproduced therefrom. The switch 4 may be selectively changed over between the two input terminals (that is, between the MPEG data and the bitstream data reproduced from the magnetic tape 3) in accordance with a switch selecting control performed by the switching control unit. Output data from the switch 4 is supplied to the MPEG decoder 5. The MPEG decoder 5 decodes the bitstream data received from the switch 4 so as to obtain the display sequence of such data and supplies the decoded data to the monitor 6 whereupon a picture corresponding to such data is displayed. Therefore, as an example, the switch 4 may select the MPEG data bitstream so as to display the same on the monitor 6 while such data bitstream is being recorded. Alternatively, the switch may select the playback data from the rate converter 22 for display on the monitor 6.

If, during slow speed reproduction, "0"s are uniformly stuffed ahead of each picture as described above, the average playback speed may be 1/k. However, since the actual display sequence differs from the picture sequence of the bitstream data, the delay or freeze time of each picture may be different. As such, if picture data is available that can be displayed, the picture is readily displayed at the frame display changeover timing, as more fully described below.

Figure 13:
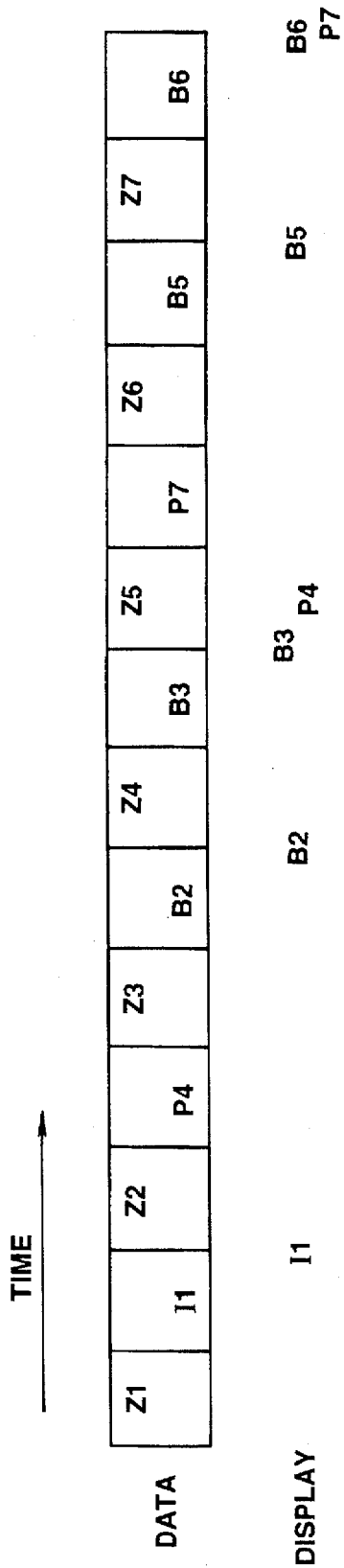
FIG. 13 is a diagram illustrating a data display in which "0"s are stuffed before each picture.

Assume that bitstream data Z1, I1, Z2, P4, Z3, B2, Z4, B3, Z5, P7, Z6, B5, Z7, B6 and so forth is supplied from the switch 4 during a ⅓ speed reproduction mode, as shown in FIG. 13. (Ix, Px and Bx represent the x'th I, P and B pictures, respectively.) As shown in FIG. 13, a picture I1 is displayed after a delay of Z1. Although a picture P4 is supplied after an interval of Z2, such picture is the fourth picture and, as such, is not displayed at this time. A second picture B2 is displayed after Z3, a third picture B3 is displayed after Z4, and then the fourth picture P4 is displayed without delay.

Since the frame rate remains unchanged even though the bit rate may become relatively low, buffer underflow may occur. If such buffer underflow occurs in the MPEG decoder, a previous picture may be maintained until data of the next picture is read. The result is slow speed reproduction of a series of several still pictures. Thus, although the picture freeze time may differ from picture to picture, a 1/k average speed reproduction is performed.

The operation of the above-described digital VTR will now be described.

During recording, the channel encoder 11 of the recording unit 1 (FIG. 1) channel codes the received MPEG data which is compression encoded in accordance with a MPEG system. The channel coded MPEG data is recorded on the magnetic tape 3 by the magnetic head of the recording unit 1 at a bit rate R.

At this time, the MPEG data supplied to the recording unit 1 is also supplied to one input terminal of the switch 4.

During 1/k speed reproduction, the MPEG data recorded on the magnetic tape 3 is read out by the rotary head of the reproducing unit 2 at a bit rate R/k and supplied to the channel decoding unit 21 whereupon such data is channel decoded. The channel decoded MPEG data is written in the RF output buffer 221a (FIG. 5) of the rate converter 22 at a bit rate of R/k. When one track of data is written into the RF output buffer 221a, the data stored in the RF output buffer once every k times of head tracing is read out and supplied to the zero-stuffing buffer 221b. When the amount of data written into the zero-stuffing buffer 221b is substantially equivalent to the number of bits of the maximum size frame, the detection circuit 222 supplies the R clock pulses (with the same bit rate R as for recording) to the delay unit 223 and the zero-stuffing buffer 221b. Based upon such clock pulses (R), the zero-stuffing buffer 221b outputs the data stored therein to the delay unit 223 and the detection circuit 222. The delay unit 223 delays the data from the zero-stuffing buffer 221b by an amount corresponding to four bytes as previously described based upon the clock pulses (R) from the detection circuit 222, and supplies the delayed data to the switch 4 (FIG. 1). The detection circuit 222 supplies the R clock pulses until a picture header is detected in the data from the zero-stuffing buffer 221b. Upon detecting a picture header, the detection circuit 222 terminates the transmission of the clock pulses (R) to the delay unit 223 and the zero-stuffing buffer 221b for a time period of (k−1)/fr. As a result, the data readout from the zero-stuffing buffer 221b and supplied to the delay unit 223 ceases for a time period of (k−1)/fr while the 4-byte picture start code data is held by the delay unit 223. The leading "00"s of the 4-byte picture start code held by the delay circuit 223 are repeatedly read out at the rate R for a time period of (k−1)/fr in accordance with the controller which may be included within the delay circuit. As a result, bitstream data having (k−1)R/fr "00"s inserted before the picture header is produced and supplied to the second input terminal of the switch 4.

The switch 4 selects one of the input terminals and supplies the data associated therewith to the MPEG decoder 5 so as to be decoded. The decoded data is displayed on the monitor 6.

Therefore, in the present invention, picture data encoded in accordance with a predictive encoding system in which picture signals are compression-coded by bi-directional motion-compensated inter-frame predictive coding followed by discrete cosine transform and variable length encoding may be recorded and/or reproduced. Such reproduction includes detecting picture headers and, in the absence of such detection, outputting stored picture data with a predetermined delay and, upon the detection of a picture header, outputting "0"s for a time period of (k−1)/fr during varying speed reproduction, wherein 1/k represents the multiple or speed reduction factor during the varying speed reproduction and fr is the frame rate. The "0" data may be inserted or stuffed between pictures or prior to picture headers in equal amounts so as to provide a picture display without picture disruption even during slow speed reproduction.

Figure 14:
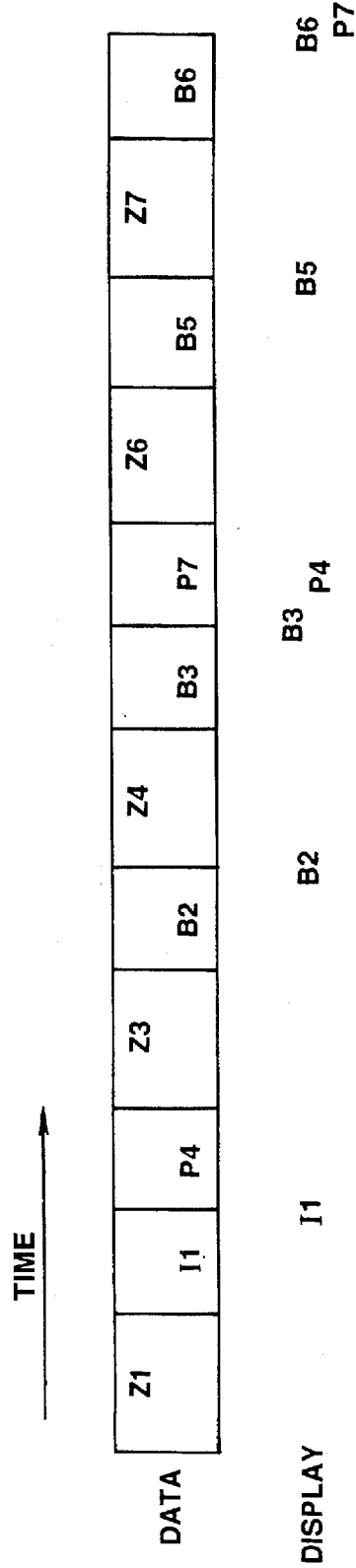
FIG. 14 is a diagram illustrating a data display in which "0"s are not stuffed before each picture.
Figure 15:
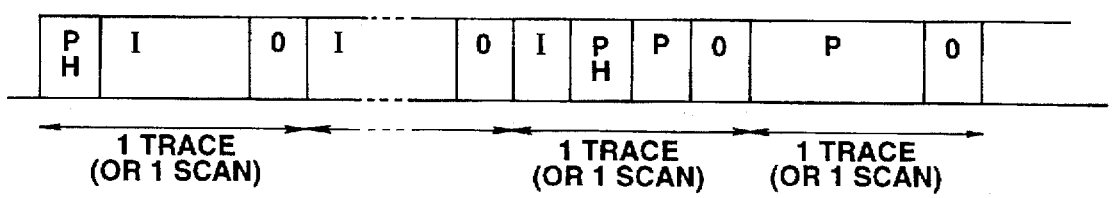
FIG. 15 is a diagram illustrating an arrangement of data having "0"s stuffed therein.

Although "0" data may be uniformly stuffed before each picture or picture header during slow speed reproduction as previously described, the present invention is not so limited. That is, the size or amount of "0" data may vary from picture to picture. For example, if a B picture in the bitstream data of FIG. 13 is to be displayed, the next P picture has already been decoded. As such, the distance between B3 and P4 or B6 and P7 should not be enlarged. However, the distance between I1 and B2 or P4 and B5 (which is larger than the distances between B3 and P4 or B6 and P7) may be reduced. As a result, stuffing may be omitted prior to the P pictures P4 and P7 (that is, Z2 and Z5 may be omitted) and the decrease thus realized may be evenly distributed to Z1, Z3, Z4, Z6 and Z7 as shown in FIG. 14. This arrangement decreases the delay or freeze time directly before the display of the B picture which next follows the P picture of the bitstream data, while increasing the freeze time directly before the display of the I picture. Accordingly, variation in the freeze time is reduced.

Alternatively, the decrease realized by omitting the stuffing prior to the P pictures P4 and P7 (that is, Z2 and Z5) may be distributed in a non-evenly manner to Z1, Z3, Z4, Z6 and Z7.

Additionally, although the present invention has been described with reference to a digital recording and reproducing apparatus, the present invention is not so limited. For example, the present invention may be applied to a reproducing apparatus.

Furthermore, although in describing the present invention specific times and/or amounts were described (such as a 4-byte delay from the delay circuit 223, a time period of (k−1)/fr, a number of "00"s equal to (k−1)R/fr and so forth), the present invention is not so limited. Alternatively, other times and/or amounts may be utilized.

Although preferred embodiments of the present invention and modifications thereof have been described in detail herein, it is to be understood that this invention is not limited to these embodiments and modifications, and that other modifications and variations may be effected by one skilled in the art without departing from the spirit and scope of the invention as defined by the appended claims.

What is claimed is:

1. An apparatus for reproducing picture data representing a plurality of video frames, said apparatus comprising:

readout means for reading out picture data encoded from picture signals by a predictive encoding system and recorded on a recording medium;

storage means for storing the picture data read out by said readout means;

detection means for detecting a picture header from the picture data stored in said storage means; and delaying means for delaying an output of the picture data stored in said storage means in response to detection results obtained by said detection means, said delaying means outputting "0"s for a predetermined time period if the picture header is detected by said detection means during varying speed reproduction, wherein said delaying means outputs "0"s for a time period of (k−1)/fr, in which 1/k is a speed multiple during the varying speed reproduction and fr is a frame rate.

2. An apparatus for recording/reproducing picture data representing a plurality of video frames, said apparatus comprising:

recording means for recording picture data encoded from picture signals by a predictive encoding system on a recording medium; and reproducing means having readout means for reading out the picture data recorded on the recording medium, storage means for storing the picture data read out by said readout means, detection means for detecting a picture header from the picture data stored in the storage means, and delaying means for delaying an output of the picture data stored in said storage means in response to detection results obtained by said detection means, said delaying means outputting "0"s for a predetermined time period if the picture header is detected by said detection means during varying speed reproduction, wherein said delaying means outputs "0"s for a time period of (k−1)/fr, in which 1/k is a speed multiple during the varying speed reproduction and fr is a frame rate.

3. An apparatus for processing encoded picture data reproduced from a recording medium as a plurality of "1"s and "0"s, said encoded picture data representing a plurality of intra-coded (I), inter-frame predictively coded (P) and bi-directionally predictive coded (B) video frames or pictures, said encoded picture data having a plurality of picture headers each corresponding to one of said pictures, said apparatus comprising:

detection means for detecting a picture header from the encoded picture data reproduced from said recording medium; and means, operative during a variable speed reproduction mode wherein said encoded picture data is reproduced at a speed different from that at which said encoded picture data was recorded, for inserting "0"s prior to the detected picture header of a respective picture, wherein the inserting means inserts "0"s for a time period of (k−1)/fr in which 1/k is a speed multiple during the varying speed reproduction mode and fr is a frame rate.

4. An apparatus according to claim 3, wherein said encoded picture data is reproduced during said variable speed reproduction mode at a speed slower than that at which said encoded picture data was recorded.

5. An apparatus for processing encoded picture data reproduced from a recording medium as a plurality of "1"s and "0"s, said encoded picture data representing a plurality of intra-coded (I), inter-frame predictively coded (P) and bi-directionally predictive coded (B) video frames or pictures, said encoded picture data having a plurality of picture headers each corresponding to one of said pictures, said apparatus comprising:

memory means for storing the encoded picture data reproduced from said recording medium;

detection means receiving the stored picture data from said memory means for detecting the picture headers therein and for generating a control signal indicative of the detection results; and means receiving the stored picture data from said memory means for delaying the received picture data when said control signal indicates that a picture header has not been detected and for inserting "0"s prior to the respective picture header of a picture when said control signal indicates that the respective picture header has been detected, wherein said encoded picture data is reproduced at a speed slower than that at which said encoded picture data was recorded, and wherein the inserting means inserts "0"s for a time period of (k−1)/fr, in which 1/k is a speed multiple reduction factor and fr is a frame rate.

6. An apparatus for processing encoded picture data reproduced from a recording medium as a plurality of "1"s and "0"s, said encoded picture data representing a plurality of intra-coded (I), inter-frame predictively coded (P) and bi-directionally predictive coded (B) video frames or pictures, said encoded picture data having a plurality of picture headers each corresponding to one of said pictures, said apparatus comprising:

memory means for storing the encoded picture data reproduced from said recording medium and for supplying the stored picture data therefrom in accordance with a clock signal;

detection means receiving the stored picture data from said memory means for detecting a picture header therein and for generating said clock signal in the absence of such detection; and means for receiving the stored picture data from said memory means and for delaying the received picture data in response to said clock signal and for inserting "0"s prior to the detected picture header of a picture in the absence of said clock signal, wherein said encoded picture data is reproduced at a speed slower than that at which said encoded picture data was recorded, and wherein the inserting means inserts "0"s for a time period of (k−1)/fr, in which 1/k is a speed multiple reduction factor and fr is a frame rate.

7. A method for reproducing picture data representing a plurality of video frames, said method comprising the steps of:

reading out picture data encoded from picture signals by a predictive encoding system and recorded on a recording medium;

storing the read out picture data;

detecting a picture header from the stored picture data; and delaying an output of the stored picture data in response to detection results, said delaying step outputting "0"s for a predetermined time period if the picture header is detected during varying speed reproduction, wherein said delaying step outputs "0"s for a time period of (k−1)/fr, in which 1/k is a speed multiple during the varying speed reproduction and fr is a frame rate.

8. A method for recording/reproducing picture data representing a plurality of video frames, said method comprising the steps of:

recording picture data encoded from picture signals by a predictive encoding system on a recording medium; and reproducing recorded picture data, said reproducing step includes reading out the picture data recorded on the recording medium, storing the read out picture data, detecting a picture header from the stored picture data, and delaying an output of the stored picture data in response to obtained detection results, said delaying step outputting "0"s for a predetermined time period if the picture header is detected during varying speed reproduction, wherein said delaying step outputs "0"s for a time period of (k−1)/fr, in which 1/k is a speed multiple during the varying speed reproduction and fr is a frame rate.

9. A method for processing encoded picture data reproduced from a recording medium as a plurality of "1"s and "0"s, said encoded picture data representing a plurality of intra-coded (I), inter-frame predictively coded (P) and bi-directionally predictive coded (B) video frames or pictures, said encoded picture data having a plurality of picture headers each corresponding to one of said pictures, said method comprising the steps of:

detecting a picture header from the encoded picture data reproduced from said recording medium; and inserting "0"s prior to the detected picture header of a respective picture during a variable speed reproduction mode wherein said encoded picture data is reproduced at a speed different from that at which said encoded picture data was recorded, wherein the inserting step inserts "0"s for a time period of (k−1)/fr in which 1/k is a speed multiple during the varying speed reproduction mode and fr is a frame rate.

10. A method for processing encoded picture data reproduced from a recording medium as a plurality of "1"s and "0"s, said encoded picture data representing a plurality of intra-coded (I), inter-frame predictively coded (P) and bi-directionally predictive coded (B) video frames or pictures, said encoded picture data having a plurality of picture headers each corresponding to one of said pictures, said method comprising the steps of:

storing the encoded picture data reproduced from said recording medium;

detecting the picture headers from the stored picture data and generating a control signal indicative of the detection results; and receiving the stored picture data and delaying the received picture data when said control signal indicates that a picture header has not been detected and inserting "0"s prior to the respective picture header of a picture when said control signal indicates that the respective picture header has been detected, wherein said encoded picture data is reproduced at a speed slower than that at which said encoded picture data was recorded, and wherein the inserting step inserts "0"s for a time period of (k−1)/fr, in which 1/k is a speed multiple reduction factor and fr is a frame rate.

11. A method for processing encoded picture data reproduced from a recording medium as a plurality of "1"s and "0"s, said encoded picture data representing a plurality of intra-coded (I), inter-frame predictively coded (P) and bi-directionally predictive coded (B) video frames or pictures, said encoded picture data having a plurality of picture headers each corresponding to one of said pictures, said method comprising the steps of:

storing the encoded picture data reproduced from said recording medium and supplying the stored picture data therefrom in accordance with a clock signal;

receiving the stored picture data and detecting a picture header therein and generating said clock signal in the absence of such detection; and receiving the stored picture data and delaying the received picture data in response to said clock signal and inserting "0"s prior to the detected picture header of a picture in the absence of said clock signal, wherein said encoded picture data is reproduced at a speed slower than that at which said encoded picture data was recorded, and wherein the inserting step inserts "0"s for a time period of (k−1)/fr, in which 1/k is a speed multiple reduction factor and fr is a frame rate.

\* \* \* \* \*

UNITED STATES PATENT AND TRADEMARK OFFICE
CERTIFICATE OF CORRECTION

PATENT NO. : 5,742,728
DATED : April 21, 1998
INVENTOR(S) : Naofumi Yanagihara et al.

It is certified that error appears in the above-identified patent and that said Letters Patent is hereby corrected as shown below:

Cancel claims 1, 2, 7 and 8.

Signed and Sealed this

Sixteenth Day of February, 1999

Attest:

*Acting Commissioner of Patents and Trademarks*

*Attesting Officer*